United States Patent
Jordan et al.

(10) Patent No.: US 12,472,999 B2
(45) Date of Patent: Nov. 18, 2025

(54) SYSTEMS AND METHODS FOR INSPECTING AN AMUSEMENT PARK ATTRACTION SYSTEM

(71) Applicant: Universal City Studios LLC, Universal City, CA (US)

(72) Inventors: Robert Michael Jordan, Orlando, FL (US); Paige Lynette Reiter, Utica, MI (US); Patrick John Goergen, Orlando, FL (US); Thomas Owen Williams, Orlando, FL (US); Sarah Anne Kelley, Orlando, FL (US); Daniel Matthew Freedman, Orlando, FL (US); Jacob David Allinson, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 406 days.

(21) Appl. No.: 18/136,144

(22) Filed: Apr. 18, 2023

(65) Prior Publication Data
US 2024/0270295 A1    Aug. 15, 2024

Related U.S. Application Data

(60) Provisional application No. 63/444,446, filed on Feb. 9, 2023.

(51) Int. Cl.
*B61L 23/04* (2006.01)
*G06T 7/00* (2017.01)
*A63G 7/00* (2006.01)

(52) U.S. Cl.
CPC ............ *B61L 23/042* (2013.01); *G06T 7/001* (2013.01); *A63G 7/00* (2013.01)

(58) Field of Classification Search
CPC ................ B61L 23/042; G06T 7/001; G06T 2207/30252; A63G 7/00
See application file for complete search history.

(56) References Cited

U.S. PATENT DOCUMENTS

| | | | |
|---|---|---|---|
| 6,615,648 B1 | 9/2003 | Ferguson et al. |
| 9,424,482 B2 | 8/2016 | Patel et al. |

(Continued)

FOREIGN PATENT DOCUMENTS

JP    2000061147 A    2/2000

OTHER PUBLICATIONS

Zheng, Danyang, "A Defect Detection Method for Rail Surface and Fasteners Based on Deep Convolutional Neural Network," Hindawi, Aug. 2, 2021, pp. 1-15, https://www.hindawi.com/journals/cin/2021/2565500/.

(Continued)

*Primary Examiner* — Samir A Ahmed
(74) *Attorney, Agent, or Firm* — Fletcher Yoder, P.C.

(57) ABSTRACT

An inspection vehicle for an attraction system of an amusement park includes one or more bogies configured to engage with a path of the attraction system, a sensor configured to capture imagery of the path, and a controller communicatively coupled to the sensor. The controller is configured to receive data indicative of a detected marker, determine a path section at which the inspection vehicle is located based on the detected marker, determine target imagery associated with the path section, receive captured imagery from the sensor, and output a control signal in response to determining a difference between captured imagery received from the sensor and the target imagery is equal to or greater than a threshold value.

20 Claims, 5 Drawing Sheets

(56) References Cited

U.S. PATENT DOCUMENTS

| | | |
|---|---|---|
| 9,441,956 B2 | 9/2016 | Kainer et al. |
| 9,600,999 B2 | 3/2017 | Stenzler |
| 10,339,656 B1 | 7/2019 | Le et al. |
| 10,362,293 B2 | 7/2019 | Mesher |
| 10,504,230 B1 | 12/2019 | Stahl et al. |
| 10,616,557 B2 | 4/2020 | Mesher |
| 10,796,192 B2 | 10/2020 | Fernandez |
| 10,909,667 B1 | 2/2021 | Tighe et al. |
| 2004/0263624 A1* | 12/2004 | Nejikovsky .......... B61L 23/042 348/148 |
| 2007/0180937 A1 | 8/2007 | Thomson et al. |
| 2007/0227274 A1 | 10/2007 | Verl et al. |
| 2010/0224098 A1 | 9/2010 | Gordon |
| 2013/0231873 A1* | 9/2013 | Fraser .................. B61K 5/00 702/35 |
| 2014/0129154 A1* | 5/2014 | Cooper ............... B61L 25/025 702/34 |
| 2018/0286144 A1 | 10/2018 | Cronin et al. |
| 2019/0054941 A1 | 2/2019 | Hydro |
| 2020/0158656 A1* | 5/2020 | Chung .................. G06T 7/0004 |
| 2021/0062567 A1 | 3/2021 | Majdali |
| 2021/0157004 A1 | 5/2021 | Graham et al. |

OTHER PUBLICATIONS

Camargo, Luis Fernando Molina, "USDOT Region V Regional University Transportation Center Final Report," Machine Vision Inspection of Railroad Track, NEXTRANS Project No. 0281Y02, Jan. 10, 2011, pp. 1-46, https://rosap.ntl.bts.gov/view/dot/18644/dot_18644_DS1.pdf?

Varadharajan, Srivatsan, "Vision for Road Inspection," Jun. 23, 2014, pp. 115-122, IEEE Winter Conference on Applications of Computer Vision, https://www.ri.cmu.edu/pub_files/2014/3/crack_detection_final.pdf.

Ensco, Inc., "Solutions for Rail Inspection," Aug. 28, 2022, pp. 1-19, https://www.ensco.com/rail/solutions-rail-inspection.

PCT/US2024/014503 International Search Report and Written Opinion mailed May 7, 2024.

\* cited by examiner

SYSTEMS AND METHODS FOR INSPECTING AN AMUSEMENT PARK ATTRACTION SYSTEM

CROSS-REFERENCE TO RELATED APPLICATIONS

This application claims priority to and benefit from U.S. Provisional Application No. 63/444,446, entitled "SYSTEMS AND METHODS FOR INSPECTING AN AMUSEMENT PARK ATTRACTION SYSTEM," filed Feb. 9, 2023, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues have a variety of features to entertain guests. For example, an amusement park may include an attraction system, such as a ride (e.g., a roller coaster), a theatrical show, an extended reality system, and so forth. The attraction system may include a ride vehicle that may move throughout or within the attraction system, such as about a path or track, during operation to entertain guests. It may be desirable to perform inspection of the path to determine a condition of the path. For example, the path may be inspected to confirm it is in a desirable condition to achieve a desired performance of the ride vehicle.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an inspection vehicle for an attraction system of an amusement park includes one or more bogie configured to engage with a path of the attraction system, a sensor configured to capture imagery of the path, and a controller communicatively coupled to the sensor. The controller is configured to receive data indicative of a detected marker, determine a path section at which the inspection vehicle is located based on the detected marker, determine target imagery associated with the path section, receive captured imagery from the sensor, and output a control signal in response to determining a difference between captured imagery received from the sensor and the target imagery is equal to or greater than a threshold value In an embodiment, a vehicle for an attraction system of an amusement park includes a bogie configured to engage with a path system of the attraction system and a controller configured to receive data indicative of a first marker associated with a beginning of a path section of the path system, monitor a quantity of identified target components for the path section in response to receiving the data indicative of the first marker, receive data indicative of a second marker associated with a conclusion of the path section, determine a total quantity of identified target components for the path section in response to receiving the data indicative of the second marker and based on monitoring of the quantity of identified target components for the path section, and output a control signal based on the total quantity of identified target components.

In an embodiment, a non-transitory computer-readable medium includes instructions that, when executed by processor, are configured to cause the processor to receive data indicative of a first marker associated with a beginning of a path section of an amusement park attraction system, identify target components for the path section in response to receiving the data indicative of the first marker, receive data indicative of a second marker associated with a conclusion of the path section, determine a total quantity of identified target components for the path section in response to receiving the data indicative of the second marker, and output a control signal based on the total quantity of identified target components.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "approximately," "generally," "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as "parallel" and "perpendicular," should not be rigidly interpreted in a strict mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

The present disclosure is directed to an attraction system of an amusement or theme park. The attraction system may include a roller coaster, a dark ride, a water ride, an underwater ride, a theatrical show, a car ride, and so forth. For example, the attraction system may include a ride vehicle in which guests may be positioned. During operation of the attraction system to entertain guests, the ride vehicle may move (e.g., translate) about a path (e.g., a track, a rail, a pathway) to impart a movement sensation (e.g., a gravitational force, an inertial force, a postural adjustment) on the guests to provide entertainment. Additionally, or alternatively, the attraction system may include a variety of show effects, and the ride vehicle may carry the guests to different locations of the attraction system to experience different show effects.

It may be desirable to maintain a property or characteristic of the path about which the ride vehicle travels to achieve a desired performance of the ride vehicle to entertain the guests. For instance, it may be desirable to determine a structural integrity of the path that enables stable movement of the ride vehicle about the path. For this reason, it may be desirable to inspect the path to determine a condition of the path, such as a coupling between path sections, a surface finish, a geometry, a texture, a topography, a profile, and the like. The desirable condition of the path may enable a desirable speed, a desirable smoothness, a desirable acceleration, a desirable rotation, or any other motion associated with the ride vehicle to be achieved. Additionally or alternatively, the desirable condition of the path may increase a useful lifespan of the attraction system, such as of the ride vehicle and/or of the path.

Unfortunately, it may be difficult and/or inefficient to inspect a path. For example, performance (e.g., manual performance) of an inspection operation may be tedious, time consuming, costly, and/or difficult. For instance, multiple users, such as technicians and operators, may be utilized to complete a single inspection operation, such as to inspect one or more sections of the path. Additionally, an inspection operation may be limited to being performed during certain environmental conditions (e.g., high ambient light levels, low precipitation conditions). Thus, an inspection operation may not be readily performed as desired. Furthermore, operation of the attraction system may be suspended to enable performance of an inspection operation. As a result, performing inspection operations may reduce efficient operation of an attraction system to entertain guests.

Thus, it is presently recognized that improving inspection of the path may achieve desirable and/or efficient operation of the attraction system to entertain guests. Accordingly, embodiments of the present disclosure are directed to a vehicle (e.g., an inspection vehicle) designed to operate and perform an inspection operation for a path of the attraction system. The vehicle may include a sensor configured to detect a marker (e.g., a gate) of the path. The vehicle may include or be communicatively coupled to a controller. The controller may receive an indication of the detected marker and determine a path section corresponding to the detected marker. The sensor or an additional sensor of the vehicle may then provide data to the controller, and the controller may determine whether the data indicates the path section is in a desirable condition.

In an embodiment, the controller may compare the received data with target data indicative of a desirable condition of the path section. As an example, the data may include captured imagery, and the target data may include target imagery associated with a desirable condition of the path section. As another example, the controller may determine a quantity of a certain component based on the data, and the target data may include a target quantity of the certain component that indicates the desirable condition of the path section. Thus, in response to a difference between the received data and the target data being equal to or greater than a threshold value, a determination may be made that the condition of the path section is undesirable. In response to a difference between the received data and the target data being below a threshold value, a determination may be made that the condition of the path section is desirable. In either case, a control signal may be output to indicate the condition of the path section, such as to indicate the path section is to be addressed based on the difference between the received data and the target data being equal to or greater than a threshold value (e.g., to prompt a user to address the path section). Each different path section may be associated with different target data indicative of a desirable condition. Therefore, the particular target data associated with each path section may be referenced for comparison to determine whether the path section is in a desirable condition. In this manner, the condition of each path section may be more accurately determined based on the particular corresponding target data being referenced. As such, actions to address a path section may be more suitably performed, and the path of the attraction system may be more desirable maintained and/or operated.

Although the present disclosure primarily discusses operation to inspect a path of an attraction system, it should be noted that similar approaches may be used to inspect other components of the attraction system. For example, the techniques discussed herein may be used to inspect a support (e.g., a pylon, a hinge, a beam) of the attraction system, show effects (e.g., an animated figure, a show set), or any other suitable feature to enable the vehicle to determine whether a condition of the attraction system is desirable.

Figure 1:
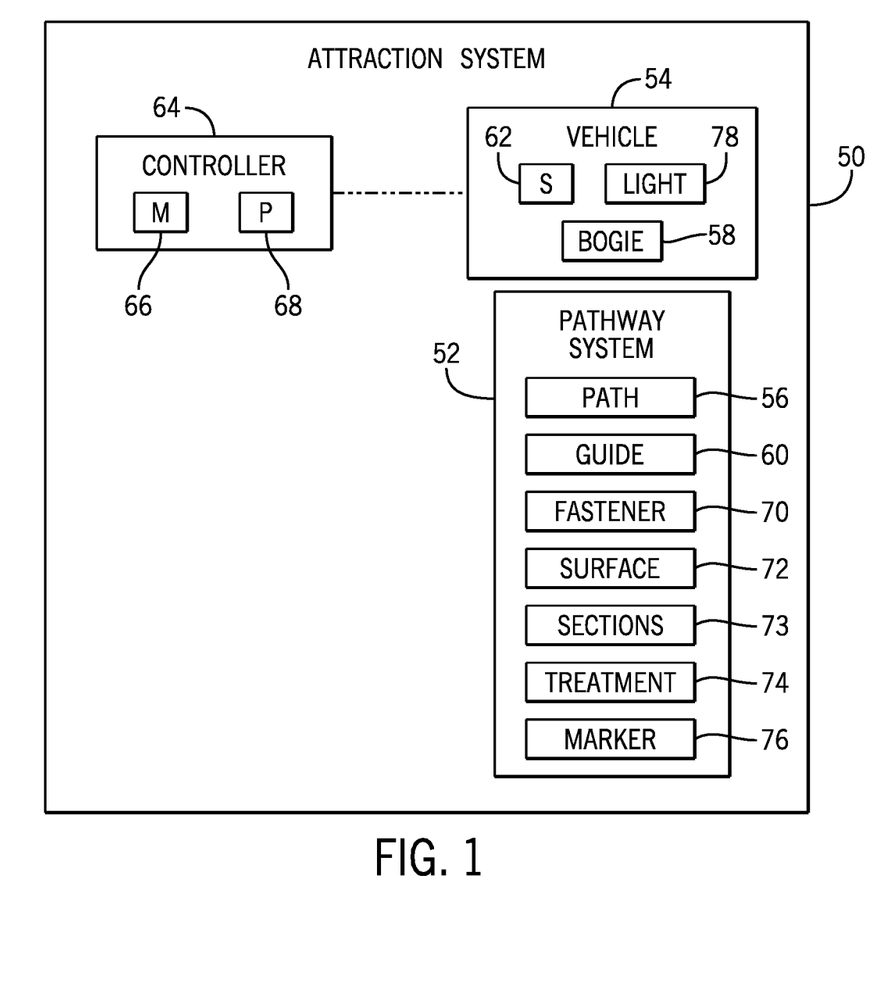
FIG. 1 is a schematic diagram of an embodiment of an attraction system of an amusement park, in accordance with an aspect of the present disclosure.

With the preceding in mind, FIG. 1 is a schematic diagram of an embodiment of an attraction system 50. The attraction system 50 may be operable to entertain one or more guests of the attraction system 50. For example, the attraction system 50 may include a ride in which guests may be carried or transported to different locations within the attraction system 50 to entertain the guests. To this end, the attraction system 50 may include a pathway system 52 (e.g., including a rail, a track, a guide, a beam) along which the guests may be transported. For instance, a ride vehicle (e.g., a vehicle 54) of the attraction system 50 may secure the guests therein and travel along the pathway system 52. Movement of the ride vehicle throughout the attraction system 50 (e.g., along the pathway system 52) may impart movement sensations on the guests to entertain the guests.

It may be desirable to maintain the pathway system 52 to achieve a desirable operation of the attraction system 50, such as to provide entertainment to the guests. For example, it may be desirable to maintain an alignment, a coupling, a surface finish, a geometry, a quality, a texture, a topography, a profile, and/or any other suitable property or characteristic of the pathway system 52. For this reason, an inspection operation may be performed with respect to the pathway system 52. A condition of the pathway system 52 may be determined as a result of the inspection operation.

In an embodiment, the attraction system 50 may include a vehicle 54 (e.g., an inspection vehicle, a maintenance vehicle) configured to perform the inspection operation. During the inspection operation, the vehicle 54 may travel throughout or within the attraction system 50, such as along the pathway system 52 used during the entertainment operation. In one embodiment, the vehicle 54 may travel along a path 56 (e.g., an open pathway, a rail, a floor) of the pathway system 52. For instance, the vehicle 54 may include a bogie 58 that is in contact or in engagement with the path 56 to drive movement of the vehicle 54 along the path 56. As an example, the bogie 58 may include wheels that enable the vehicle 54 to translate along the path 56.

The pathway system 52 may include a guide 60 that directs or steers the vehicle 54 along the path 56. As an example, the guide 60 may include a rail, a projection, an extension, or a protrusion to which the bogie 58 may be coupled. Thus, the guide 60 may physically contact the bogie 58 to drive movement of the vehicle 54 along the path 56. The guide 60 may be an existing component of the attraction system 50, such as that utilized by a ride vehicle to navigate the pathway system 52 during the entertainment operation. In this way, the vehicle 54 may navigate the pathway system 52 without usage of additional equipment or components dedicated to facilitating movement of the vehicle 54 through the attraction system 50, thereby reducing a cost associated with implementation and/or operation of the vehicle 54 and/or enabling the vehicle 54 to be readily used for inspecting the pathway system 52.

As another example, the guide 60 may direct the vehicle 54 without contacting the vehicle 54. For instance, the vehicle 54 may include a vehicle sensor 62, which may represent one or more sensors, operable to monitor a parameter associated with the guide 60, and the vehicle 54 may be moved based on the parameter of the guide 60. By way of example, the vehicle sensor 62 may be operable to receive a signal or other indicator (e.g., a visual indicator) deflected off or output by the guide 60 (e.g., a transmitter, barcode). For instance, the vehicle sensor 62 may include an optical sensor (e.g., a camera), a scanner, a receiver, an ultrasonic sensor, a light detection and ranging (LIDAR) sensor, a sonar sensor, or another suitable sensor configured to detect the signal or other indicator. The vehicle 54 may also include or be communicatively coupled to a controller 64 (e.g., an automation controller, a programmable controller, an electronic controller, control circuitry, a cloud computing system, a control system) of the attraction system 50. The controller 64 may include a memory 66 and processor 68. The memory 66 may include volatile memory, such as random-access memory (RAM), and/or non-volatile memory, such as read-only memory (ROM), optical drives, hard disc drives, solid-state drives, or any other non-transitory computer-readable medium that includes instructions. The processor 68 may be operable to execute such instructions. For example, the processor 68 may include one or more application specific integrated circuits (ASICs), one or more field programmable gate arrays (FPGAs), one or more general purpose processors, or any combination thereof. The controller 64 may be communicatively coupled to the vehicle sensor 62 and may receive data from the vehicle sensor 62, and such data may indicate receipt of a signal or other indicator (e.g., from the guide 60) at the vehicle sensor 62. The controller 64 may then move (e.g., steer, direct) the vehicle 54 based on the data received from the vehicle sensor 62.

The controller 64 may also operate the vehicle 54 to determine a condition of the pathway system 52. For instance, the vehicle sensor 62 may visually inspect the pathway system 52 and provide data indicative of the visual inspection to the controller 64. By way of example, the vehicle sensor 62 may capture imagery (e.g., an image, a video, machine vision) of the pathway system 52, the controller 64 may receive the captured imagery and determine the condition of the pathway system 52 based on the captured imagery. In one embodiment, the controller 64 may compare the captured imagery with target imagery. The target imagery may be associated with a desirable condition of the pathway system 52. Thus, a difference between the captured imagery and the target imagery may indicate the condition of the pathway system 52 is undesirable. For this reason, in response to determining a difference between the captured imagery and the target imagery is equal to or greater than a threshold (e.g., the captured imagery and the target imagery include a quantity of differing pixels or an amount of differently appearing portions that is equal to or greater than a threshold value), the controller 64 may determine the condition of the pathway system 52 is undesirable. As a result, the controller 64 may output the control signal to address the undesirable condition of the pathway system 52. For example, the controller 64 may output the control signal to provide an alert (e.g., a visual output, an audio output, a notification transmitted to a mobile device) and inform a user, such as a technician and/or an operator, of the undesirable condition of the pathway system 52, thereby prompting the user to address the undesirable condition of the pathway system 52. Additionally, or alternatively, the controller 64 may output the control signal to instruct the attraction system 50 to adjust operations, such as to reduce and/or suspend the entertainment operation of the attraction system 50.

In an embodiment, the vehicle sensor 62 may capture imagery of a fastener 70, and the controller 64 may determine a condition of the fastener 70 based on the imagery. As an example, the captured imagery of the fastener 70 may indicate general presence of the fastener 70. That is, the captured imagery may indicate whether the fastener 70 is detected at an expected location about the pathway system 52. As another example, the captured imagery of the fastener 70 may indicate a positioning or orientation of the fastener 70, such as an extent to which the fastener 70 is tightened or inserted within an opening.

For instance, the fastener 70 may include a torque stripe. The torque stripe may include a visual indicator, such as a paint, a marker, an etching, applied to the fastener 70, such as a head of the fastener 70, a washer onto which the fastener 70 is coupled, a nut to which the fastener 70 is engaged, and/or a surface in which the fastener 70 extends. For example, the torque stripe may extend (e.g., linearly extend) about the fastener 70, the washer, the nut, and/or the surface. An orientation of the torque stripe (e.g., a direction of extension of the torque stripe of the fastener 70, an alignment between the torque stripe of the fastener 70 and the torque stripe of the washer, the nut, and/or the surface) may indicate the positioning of the fastener 70, such as whether the fastener 70 is undesirably rotated relative to the surface. As an example, a linear alignment between the torque stripe of the fastener 70 and the torque stripe of the washer, the nut, and/or the surface may indicate the fastener 70 is in a desirable positioning (e.g., fastened). However, a misalignment between the torque stripe of the fastener 70 and the torque stripe of the washer, the nut, and/or the surface may indicate the fastener 70 is in an undesirable positioning (e.g., unfastened, inadvertently rotated). Additionally or alternatively, the fastener 70 may include an identifier (e.g., a quick response code) that may be positioned over a portion of the fastener and a feature (e.g., plate, rail, beam, nut) to which the fastener is coupled. In a desirable positioning of the fastener 70, the identifier may be scanned by the vehicle sensor 62. However, in an undesirable positioning of the fastener 70, the vehicle sensor 62 may not be able to scan the identifier because the identifier will be contorted. Thus, the detection of the identifier by the vehicle sensor 62 may indicate whether the fastener 70 is desirably positioned. As a further example, the captured imagery of the fastener 70 may indicate a structural condition of the fastener 70, such as a deformation (e.g., a crack, a change in geometry), a formation (e.g., rusting), and the like. Thus, the captured imagery of the fastener 70 may indicate whether the fastener 70 is arranged in a desired state or may even confirm a particular undesired state. This may further indicate a condition of the pathway system 52, such as a condition of a coupling or decoupling of components (e.g., path sections 73) of the pathway system 52.

In an additional or alternative embodiment, the vehicle sensor 62 may capture imagery of a surface 72 (e.g., a surface 72 of the path 56 along which the vehicle 54 travels, a surface with which the vehicle 54 is engaged), and the controller 64 may determine a condition of the surface 72 based on the captured imagery. For example, the vehicle sensor 62 may capture imagery each time the vehicle 54 travels along the pathway system 52. The captured imagery of the surface 72 may indicate a geometry of the surface 72, such as whether the surface 72 has a smooth profile, a bump, a crack, a particular texture, and the like. The captured imagery of the surface 72 may additionally or alternatively indicate a color of the surface 72. The color of the surface 72 may further indicate wear (e.g., abrasion) of the surface 72, a chemical composition of the surface 72 (e.g., whether the surface 72 has any rust), formations (e.g., dirt, debris) on the surface 72, and so forth. Further, the captured imagery of the surface 72 may be stored over time and the controller 64 may use the captured imagery to determine a wear status, a correlation between usage and wear, historical wear progression, extrapolate future wear, and/or the like. The captured imagery of the surface 72 may further indicate a positioning of the surface 72, such as an alignment and/or coupling between different sections of the surface 72. The captured imagery of the surface 72 may indicate whether the surface 72 may enable desirable movement of the vehicle 54 about the path 56 and/or desirable coupling of the vehicle 54 to the pathway system 52.

In a further embodiment, the vehicle sensor 62 may capture imagery of treatment 74 applied to the pathway system 52, such as to the path 56. The treatment 74 may include any additional material applied to the pathway system 52, such as a coating (e.g., a paint coating, a protective resin layer), a cover (e.g., a sleeve), and the like. Such additional material may facilitate maintaining a condition, such as a structural integrity, of a certain component (e.g., the path 56) of the pathway system 52 and/or facilitate desirable operation of the attraction system 50 (e.g., reduced friction of the pathway system 52 to enable desirable movement of the vehicle 54). The imagery of the treatment 74 may indicate whether the additional material remains desirably applied to the pathway system 52.

In one embodiment, the operation of the controller 64 to determine the condition of the pathway system 52 may be performed based on machine learning. As an example, the controller 64 may utilize a model or algorithm to perform operations to determine the condition of the pathway system 52, and a user may verify (e.g., by manually inspecting captured imagery) whether the controller 64 correctly determined the condition of the pathway system 52. For example, the model may be trained using a mixture of real-world imagery and synthetic imagery (e.g., generated via a gaming engine and randomizers). The controller 64 may perform a two-pass filter (e.g., two stage object detection and classification, two-pass detector-classifier, two-step technique) on each imagery in which a first filter may identify a presence and location of a component (e.g., a fastener, a path) and a second filter may determine a condition of the component (e.g., a positioning of the fastener, a deformation of the path). The controller 64 may then output an indication of a determined condition as a result of the two-pass filter. The user may provide feedback to the controller 64 to indicate whether the controller 64 correctly determined the condition of the pathway system 52, and the controller 64 may adjust the model based on the feedback. As an example, in response to receiving feedback indicating that the condition of the pathway system 52 was incorrectly determined, the controller 64 may adjust the model to address the incorrectly determined condition and attempt to determine a subsequent condition more accurately. As another example, in response to receiving feedback indicating that the condition of the pathway system 52 was correctly determined, the controller 64 may solidify and strengthen the model to maintain accurate determination of a subsequent condition. Thus, the controller 64 may improve the model based on the feedback provided by the user and determine the condition of the pathway system 52 more accurately.

In addition to or as an alternative to comparing captured imagery to target imagery, the controller 64 may determine a quantity of a certain component based on the captured imagery. By way of example, the controller 64 may count or tally the quantity of fasteners 70 (e.g., desirably positioned fasteners 70). For instance, the controller 64 may increase the counted quantity each time the controller determines captured imagery includes the fastener 70, such as based on the captured imagery of the fastener 70 matching with the target imagery of the fastener 70. The controller 64 may determine a total quantity of the certain component and compare the total quantity to a target quantity, which may indicate an expected or desirable quantity of the certain component. Thus, a difference between the total quantity and the target quantity being equal to or greater than a threshold quantity may indicate an undesirable quantity of the certain component, which may further indicate an undesirable condition of the pathway system 52. As such, the controller 64 may output a control signal in response to determining the difference between the total quantity and the target quantity is equal to or greater than the threshold quantity to address the undesirable condition of the pathway system 52.

The controller 64 may further determine a location of the vehicle 54 in the attraction system 50. As an example, the pathway system 52 may include a marker 76 (e.g., representative of one or more markers 76) that may be used by the controller 64 to determine the location of the vehicle 54 with respect to the pathway system 52 (e.g., about the path 56). For instance, the marker 76 may include a physical indicator, such as a quick response code (e.g., a barcode), of which the vehicle sensor 62 may capture imagery for transmission to the controller 64. Additionally or alternatively, the marker 76 may include a transmitter (e.g., a radio-frequency identification tag) configured to output a signal that may be received by the vehicle sensor 62. The marker 76 (e.g., a gate) may be associated with a particular section, segment, or area of the pathway system 52, such as an end boundary or border of the section. The vehicle sensor 62 may transmit an indication of a detected marker 76 (e.g., an imagery of the marker 76, a signal transmitted from the marker 76), and the controller 64 may identify the marker 76 and the section of the pathway system 52 associated with the marker 76. In response, the controller 64 may determine the location of the vehicle 54 at the section of the pathway system 52.

In one embodiment, the controller 64 may determine the target imagery and/or the target quantity of a certain component based on the location of the vehicle 54. Indeed, different sections of the pathway system 52 may be associated with respective parameters (e.g., arrangement of fasteners 70, types of surfaces 72, applied treatment 74) indicative of a desirable condition. Thus, by utilizing the target imagery and/or the target quantity associated with a particular section, the controller 64 may more accurately determine the condition of the particular section.

The controller 64 may further determine, predict, or extrapolate a potential future fault associated with the pathway system 52. For example, the controller 64 may determine that a current difference between captured imagery and target imagery is below the threshold value that would prompt outputting a control signal to provide an alert to address an undesirable condition, but the controller 64 may determine a timeline or timeframe in which an undesirable condition may occur (e.g., in which the difference between the capture imagery and the target imagery may be equal to or greater than the threshold value). In other words, although a current condition of the pathway system 52 may be desirable, the controller 64 may predict when the condition of the pathway system 52 may no longer be desirable. By way of example, based on received captured imagery, the controller 64 may determine that one of the fasteners 70 is showing onset of rust, but the amount of rust may not cause the difference between the captured imagery and the target imagery to be equal to or greater than the threshold value. However, the controller 64 may determine a predicted progression of the rust that may eventually cause the difference between the captured imagery and the target imagery to be equal to or greater than the threshold value to indicate a detected fault associated with the pathway system 52. The controller 64 may output a control signal in response to the predicted progression. In another example, the controller 64 may overlay captured imagery of the surface 72 over time onto the model to determine future wear and/or maintenance. For example, imagery may be captured during each ride cycle and the captured imagery may be aggregated (e.g., overlaid, combined, superimposed) to determine fault (e.g., wear) to the pathway system 52. Additionally, the controller 64 may store a wear tolerance value for the pathway system 52. The controller 64 may determine a rate of wear for the pathway system 52 based on the captured imagery and also determine trends and/or relationships based on the captured imagery. For example, the controller 64 may determine future fault based on the wear tolerance value and the rate of wear for the pathway system 52. For instance, the controller 64 may determine a period of time (e.g., within three months) in which the fastener 70 is to be replaced to avoid the future fault from occurring, and the controller 64 may output a control signal to provide an alert based on the period of time (e.g., to inform a user to replace the fastener 70 within three months). The controller 64 may utilize any suitable parameter to determine the potential future fault, including previously captured imagery (e.g., to indicate progression of the component), a parameter associated with operation of the attraction system 50 (e.g., a number of ride cycles, a frequency of ride cycles, a speed of a ride vehicle across the path 56, a weight of the ride vehicle), an environmental condition (e.g., moisture content, a temperature), or any other suitable parameter that may indicate or affect progression of a potential future fault.

The vehicle 54 may also include a light output device 78 in an embodiment. The light output device 78 may output light or other electromagnetic wave toward the pathway system 52 to facilitate operation of the controller 64. For example, the light output device 78 may direct light to improve visibility of the pathway system 52 and to enable the controller 52 to identify different components (e.g., the fastener 70, the surface 72 the treatment 74, the marker 76) of the pathway system 52, such as captured imagery of the components, more easily. As such, the controller 64 may more accurately determine a condition of the pathway system 52 via operation of the light output device 78. In an embodiment, an arrangement of the light output device 78 may be adjustable. For example, the controller 64 may instruct the light output device 78 to adjust a direction in which the light is output and/or to adjust an intensity of the light, such as to adjust a brightness level, reduce obstructions (e.g., shadow), or otherwise improve visibility of the pathway system 52.

In an embodiment, the vehicle 54 may be a dedicated vehicle used to perform an inspection operation for the attraction system 50. That is, the vehicle 54 may perform the inspection operation and may not perform other functionalities. As an example, the attraction system 50 may suspend the entertainment operation, and the vehicle 54 may perform the inspection operation while the entertainment operation is suspended. In an additional or alternative embodiment, the vehicle 54 may function as a ride vehicle that receives guests and carries the guests about the path system 52 during the entertainment operation of the attraction system 50. The vehicle 54 may therefore perform the inspection operation in addition to (e.g., simultaneously with) the entertainment operation. As such, the inspection operation may be performed without suspending the entertainment operation to improve efficient operation of the attraction system 50 to entertain guests. In an embodiment, the vehicle 54 may be a dedicated vehicle used to perform the inspection operation that may not suspend the entertainment operation. For example, the vehicle 54 may be attached to a ride vehicle that receives guests. The vehicle 54 may be pulled by the ride vehicle and the vehicle 54 may capture imagery of the path system 52 during the entertainment operations.

Figure 2:
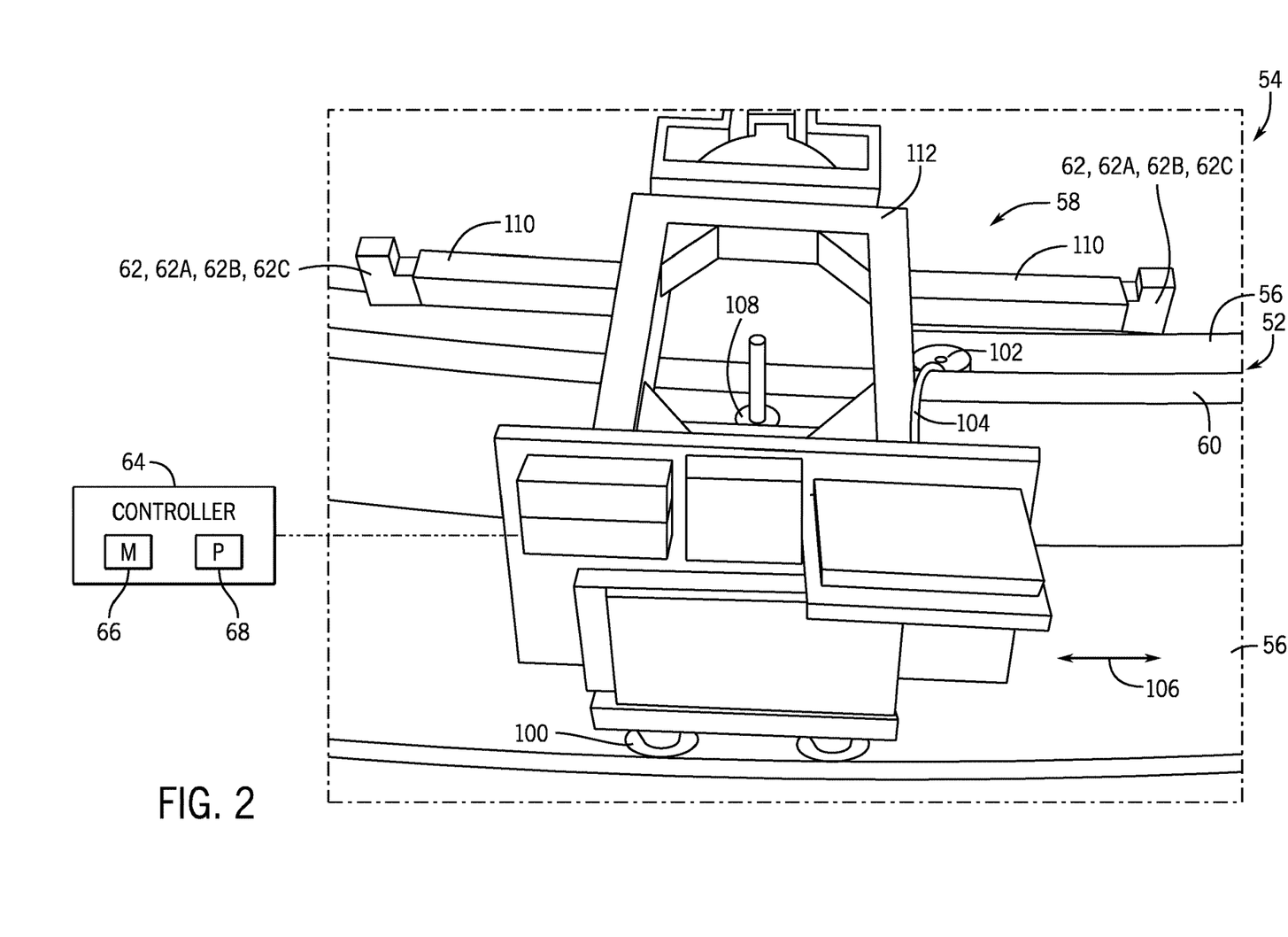
FIG. 2 is a perspective side view of an embodiment of an inspection vehicle of an attraction system, in accordance with an aspect of the present disclosure.

FIG. 2 is a side perspective view of an embodiment of the vehicle 54 configured to perform an inspection operation for the pathway system 52. For example, the pathway system 52 may include paths 56 and the guide 60 extending crosswise (e.g., vertically) from the paths 56. The bogie 58 of the vehicle 54 may include first wheels 100 configured to engage with at least one of the paths 56 (e.g., a surface of the paths 56), as well as second wheels 102 configured to engage with the guide 60. The first wheels 100 may facilitate movement (e.g., translation) of the vehicle 54 along the paths 56, and the second wheels 102 may enable movement (e.g., translation) of the vehicle 54 along the guide 60. In an embodiment, the vehicle 54 may include a clamp 104 (e.g., a rubber band, a spring) configured to bias the bogie 58 against the guide 60 to maintain a coupling between the vehicle 54 and the pathway system 52. By way of example, the clamp 104 may bias the second wheels 102 against the guide 60, thereby causing the second wheels 102 to capture and remain in engagement with the guide 60. As a result, the vehicle 54 may remain coupled to the pathway system 52, and the guide 60 may drive movement of the vehicle 54 along the paths 54.

The vehicle 54 may generally travel in directions 106 (e.g., linear directions, a forward direction, a reverse direction) along the pathway system 52. For example, the vehicle 54 may include a motor 108 (e.g., a direct drive motor, an brushed motor, a brushless motor), and the controller 64 may instruct the motor 108 to drive rotation of any of the first wheels 100 or the second wheels 102 to drive movement of the vehicle 54 in the directions 106. In an additional or alternative embodiment, the vehicle 54 may be driven to move in a different manner. For instance, an external force (e.g., a manually applied force, a gravitational force) may drive movement of the vehicle 54 along the pathway system 52.

The illustrated bogie 58 of the vehicle 54 also includes extensions 110. A respective vehicle sensor 62 may be coupled to each extension 110. The extensions 110 may position the vehicle sensors 62 over or adjacent to the portions of the pathway system 52 (e.g., the paths 56) to be detected by the vehicle sensors 62. For example, the extensions 110 may position the vehicle sensors 62 to detect a fastener, a surface, a treatment, and/or a marker of the paths 56. By way of example, the extensions 110 may generally extend away from a central portion 112 of the vehicle 54 in the directions 106. As such, the extensions 110 may facilitate determination of the condition of the pathway system 52 via the controller 64. It should be noted that the vehicle 54 may include any suitable number of vehicle sensors 62, such as a single vehicle sensor 62, two vehicle sensors 62, or more than two vehicle sensors 62, configured to visually inspect the pathway system 52 and provide data to the controller 64. For instance, the vehicle sensors 62 may provide captured imagery of the same component to the controller 64, and the controller 64 may utilize multiple captured imagery as redundancy to verify a condition of the pathway system 52. Indeed, the controller 64 may compare data received from each vehicle sensor 62 and more accurately determine the condition of the pathway system 52 based on the different data. Additionally or alternatively, each different vehicle sensor 62 may be used to determine a different component of the path 56. For example, a first vehicle sensor 62A may be dedicated to detecting a marker, a second vehicle sensor 62B may be dedicated to capturing imagery of a fastener, a third vehicle sensor 62C may be dedicated to capturing imagery of a surface, and so forth. Thus, each vehicle sensor 62 may perform specific functionalities.

In an embodiment, the extensions 110 may be adjustable or repositionable. For example, each extension 110 may be configured to move (e.g., via instructions provided by the controller 64) to adjust the position of the vehicle sensors 62 relative to the path system 52. Movement of the vehicle sensors 62 may enable the vehicle embodiment of the vehicle 54 may be used to inspect different pathway systems 52, thereby reducing a cost and/or complexity associated with manufacture, implementation, and/or operation of respective vehicles 54 for inspecting different pathway systems 52. Moreover, certain components of the vehicle 54 (e.g., the bogie 58, the vehicle sensors 62, the controller 64) may be modular and may be more easily decoupled from one another to facilitate decoupling of the vehicle 54 from a pathway system 52 and/or coupling of the vehicle 54 to a pathway system 52. As such, the vehicle 54 may be implemented more easily and/or efficiently (e.g., by a user), and an inspection operation of a particular pathway system 52 may be more readily performed by the vehicle 54.

Moreover, although the illustrated vehicle 54 is configured to directly engage with the pathway system 52 (e.g., the same pathway system 52 along which a ride vehicle may travel), in an additional or alternative embodiment, the vehicle 54 may travel along and inspect the pathway system 52 without being directly coupled to the pathway system 52. By way of example, the vehicle 54 may travel adjacent to, laterally to, above, or below the pathway system 52. For instance, the vehicle 54 may be coupled to and may travel along an additional path extending alongside the pathway system 52, and the vehicle 54 (e.g., the vehicle sensors 62) may extend over the pathway system to enable the vehicle 54 to inspect the pathway system 52. Further still, the vehicle 54 may utilize any other suitable component, in addition to or as an alternative to the wheels 100, 102, to travel along the pathway system 52. For example, the vehicle 54 may utilize appendages (e.g., legs), a gear, a chain, a conveyor, and so forth.

Figure 3:
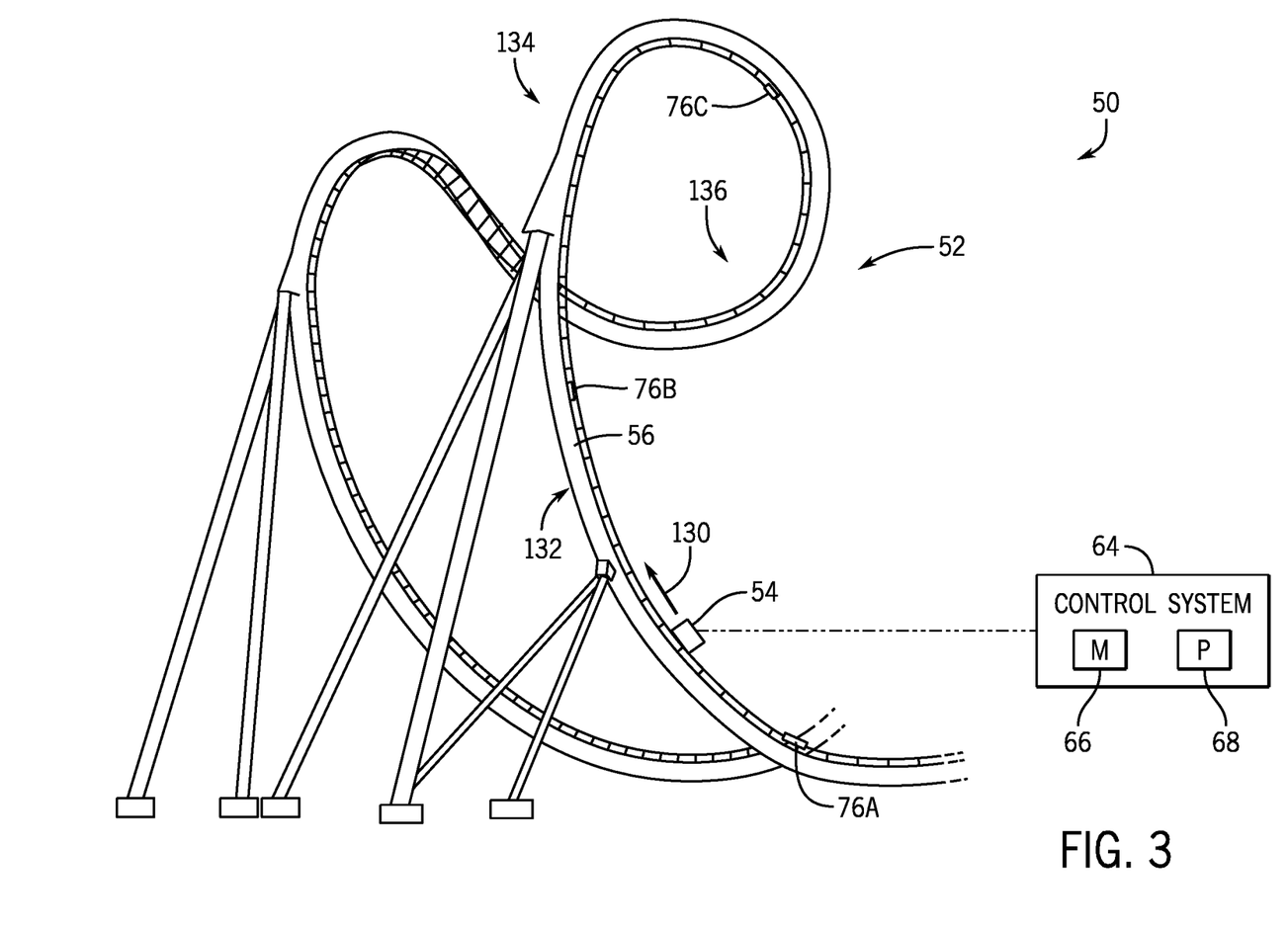
FIG. 3 is a perspective view of an embodiment of an attraction system of an amusement park, in accordance with an aspect of the present disclosure.

FIG. 3 is a perspective view of an embodiment of the attraction system 50 having the pathway system 52. In the illustrated embodiment, the vehicle 54 is coupled to the path 56 of the pathway system 52 and is configured to perform an inspection operation. For example, the vehicle 54 may travel along the path 56, such as in a forward direction 130, and the controller 64 may receive data to determine a condition of the path system 52.

As discussed herein, the controller 64 may determine a particular location of the vehicle 54 based on received data associated with a marker 76 to determine a condition of a section of the path system 52 more accurately. In the illustrated embodiment, the path system 52 includes a first marker 76A, a second marker 76B, and a third marker 76C. The first marker 76A may be associated with a first path section 132, the second marker 76B may be associated with a second path section 134, and the third marker 76C may be associated with a third path section 136. For example, the markers 76A, 76B, 76C may be associated with a beginning, an onset, or an upstream end of the first path section 132, the second path section 134, and the third path section 136, respectively. Additionally, or alternatively, the markers 76A, 76B, 76C may be associated with a conclusion, an ending, or a downstream end of the first path section 132, the second path section 134, and the third path section 136, respectively, such as for when the vehicle 54 travels in a reverse direction opposite of the forward direction 130 about the path 56.

The controller 64 may therefore determine the location of the vehicle 54 with respect to the path sections 132, 134, 136 based on detection of the markers 76A, 76B, 76C. The controller 64 may also determine target imagery and/or a target quantity associated with a desirable condition of the location of the vehicle 54. For example, in response to receiving an indication of detection of the first marker 76A, the controller 64 may determine the vehicle 54 is located at the first path section 132. The controller 64 may then determine (e.g., retrieve) target imagery and/or a target quantity associated with a desirable condition of the first path section 132 for comparison with received data (e.g., captured imagery, determined quantity). Subsequently, in response to receiving an indication of detection of the second marker 76B, the controller 64 may determine that the vehicle 54 has completed travel of the first path section 132 and has moved to the second path section 134. Thus, the controller 64 may determine target imagery and/or a target quantity associated with a desirable condition of the second path section 134, instead of the target imagery and/or the target quantity associated with a desirable condition of the first path section 132, for comparison with received data. In this manner, the controller 64 may utilize and reference information that may be more representative of a desirable condition of the particular path section at which the vehicle 54 is located based on the detection of the markers 76A, 76B, 76C.

In the illustrated embodiment, a portion of the second path section 134 may overlap (e.g., vertically overlap) with a portion of the first path section 132. For example, the second path section 134 may partially extend over the first path section 132. Thus, certain location parameters used to determine the location of the vehicle 54 with respect to the path system 52 may not be precise or feasible. For example, a global positioning system (GPS) coordinate, such as a latitude and longitude, of the portion of the second path section 134 may match with a GPS coordinate of the portion of the first path section 132. In this manner, the GPS coordinate may not precisely indicate the location of the vehicle 54 with respect to the path system 52 (e.g., whether the vehicle 54 is located at the first path section 132 or at the second path section 134). Thus, the controller 64 may not accurately determine at which path section the vehicle 54 is located based on the GPS coordinate alone. However, because the markers 76A, 76B, 76C correspond to the specific, respective path sections 132, 134, 136, detection of the markers 76A, 76B, 76C may more accurately enable the controller 64 to determine the location of the vehicle 54 with respect to the path system 52, such as at a particular path section. Additionally, usage (e.g., installation, maintenance) of the markers 76A, 76B, 76C may be more cost-effective and/or more easily performed than usage (e.g., operation) associated with using a GPS or similar technique. Thus, the markers 76A, 76B, 76C may enable performance of the inspection operation to be more desirably implemented.

Each of FIGS. 4 and 5 discussed below illustrates a respective method for operating the vehicle 54 of FIGS. 1-3. Any suitable device (e.g., the processor 68 of the controller 64 of FIGS. 1-3) may perform the methods. In one embodiment, the methods may be performed by executing instructions stored in a tangible, non-transitory, computer-readable medium (e.g., the memory 66 of the controller 64 of FIGS. 1-3). For example, the methods may be performed at least in part by one or more software components, one or more hardware components, one or more software applications, and the like. While each method is described using operations in a specific sequence, additional operations may be performed, the described operations may be performed in different sequences than the sequence illustrated, and/or certain described operations may be skipped or not performed altogether. Moreover, the respective operations associated with each method may be performed in any relation with one another, such as in parallel or in response to one another.

Figure 4:
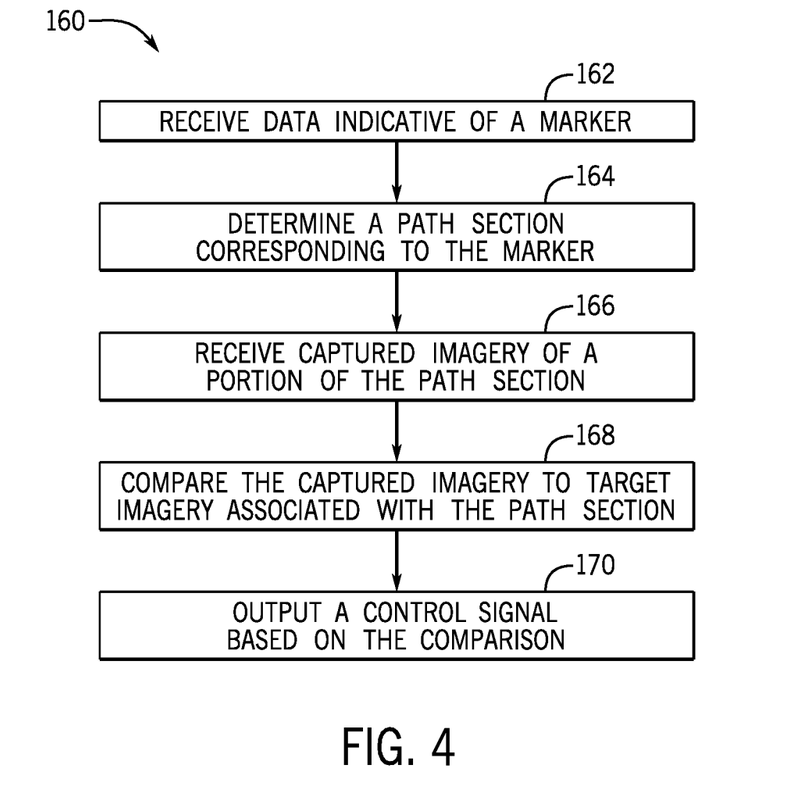
FIG. 4 is flowchart of an embodiment of a method for operating an inspection vehicle of an attraction system, in accordance with an aspect of the present disclosure.

FIG. 4 is a flowchart of an embodiment of a method 160 for operating a vehicle to perform an inspection operation for a path system of an attraction system. At block 162, data indicative of a marker (e.g., a gate) is received. The data indicative of the marker may be image data. For example, a sensor of a vehicle traversing the path system may detect a marker. In an embodiment, the sensor may capture imagery of the marker, which may include a physical indicator (e.g., a barcode) of a location about the path system. The sensor may transmit data corresponding to the captured imagery for assessment. In an additional or alternative embodiment, the sensor may receive a signal emitted by the marker, and the sensor may transmit an indication of receipt of the signal as the data indicative of the marker.

At block 164, a path section (e.g., a track segment, a path zone, a path region) corresponding to the marker is determined. For example, the path system may have multiple markers, and stored data may associate each marker with a respective, corresponding path section of the path system. The stored data may be referenced, and the respective, corresponding path section associated with the detected marker, as indicated by the stored data, may be selected as the determined path section.

At block 166, captured imagery of a portion of the path section may be received. For instance, the sensor or an additional sensor of the vehicle may capture the imagery and transmit the captured imagery. The captured imagery may, as an example, include a fastener, a surface, a treatment, or any suitable component, material, equipment, or other portion of the path section.

At block 168, the captured imagery may be compared to target imagery associated with the path section. By way of example, stored data may associate respective target imagery with each path section. Each respective target imagery may indicate a particular desirable condition for the associated path section. Based on the stored data, the target imagery associated with the path section corresponding to the detected marker may be determined. The captured imagery may then be compared to the target imagery. The comparison between the captured imagery and the target imagery may facilitate determination of whether a current condition of the path section, as indicated by the captured imagery, is desirable.

At block 170, a control signal may be output based on the comparison between the captured imagery and the target imagery. In an embodiment, the control signal may be output based on a difference between the captured imagery and the target imagery being equal to or greater than a threshold value. For example, the difference between the captured imagery and the target imagery being equal to or greater than the threshold value may indicate the current condition of the path section is undesirable. Thus, the control signal may be output to facilitate addressing the current condition of the path section. As an example, the control signal may instruct an alert (e.g., a visual output, an audio output, a notification transmitted to a mobile device) to be output to prompt a user to address the path section. As another example, the control signal may be output to directly address the path section. For instance, the difference between the captured imagery and the target imagery being equal to or greater than the threshold value may indicate a fastener is not properly positioned within a particular opening. Thus, in response to determining the difference between the captured imagery and the target imagery being equal to or greater than the threshold value, the control signal may be output to instruct an actuator to properly position the fastener within the particular opening, to remove the fastener from the particular opening, to replace the fastener from the particular opening, and so forth. As such, the current condition of the path section may be automatically addressed.

In an additional or alternative embodiment, the control signal may be output based on the difference between the captured imagery and the target imagery being below the threshold value. For instance, the difference between the captured imagery and the target imagery being below the threshold value may indicate the current condition of the path section is desirable. As such, the control signal may be output to indicate the path section is in the desirable condition, thereby indicating that no additional action may be performed to address the condition of the path section.

The method 160 may be continually and/or repeatedly performed. For example, the vehicle may continue to travel about the path system, such as to different path sections. At each path section, captured imagery may be received and compared to associated target imagery to determine the condition of the path section. Thus, the condition of each path section may be inspected, such as based on the target imagery representative of a desirable condition for that particular path section.

Figure 5:
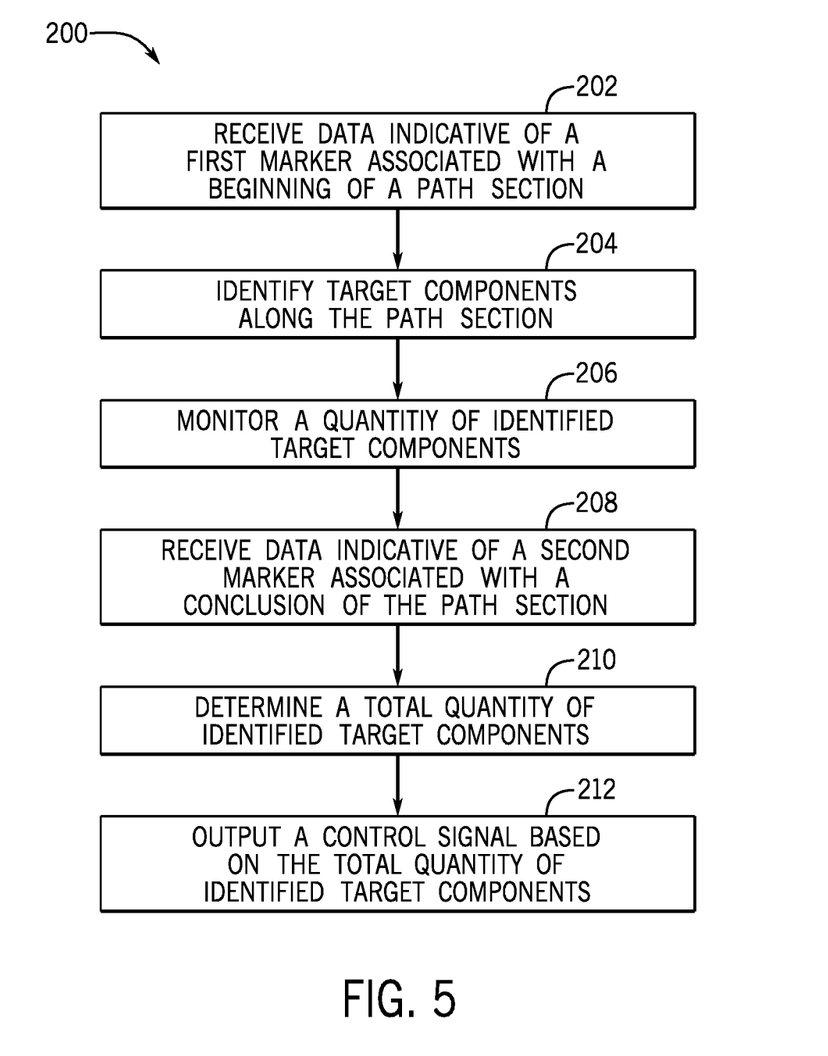
FIG. 5 is a flowchart of an embodiment of a method for operating an inspection vehicle of an attraction system, in accordance with an aspect of the present disclosure.

FIG. 5 is a flowchart of an embodiment of a method 200 for operating a vehicle to perform an inspection operation for a path system of an attraction system. At block 202, data indicative of a first marker (e.g., a first gate) associated with a beginning of a path section (e.g., a track segment, a path zone, a path region) is received, such as from a sensor of a vehicle traversing the path system. For example, the data may be received based on captured imagery and/or a received signal emitted by the marker.

At block 204, target components (e.g., fasteners, brackets, supports, rails, etchings) about the path section may be identified. In an embodiment, captured imagery of a portion of the path section (e.g., a portion about which a target component is expected to be located) may be received. The captured imagery may be compared with target imagery indicative of a presence of the target component, and the target component may be identified based on a match between the captured imagery and the target imagery (e.g., based on a difference between the captured imagery and the target imagery being below a threshold value). In an additional or alternative embodiment, the target components may include a component (e.g., a transmitter) configured to emit a signal, and the target components may be identified based on receipt of the signal.

At block 206, a quantity of identified target components may be monitored. That is, identified target components may be tallied or counted. By way of example, as each target component is identified, the quantity of identified target components may be increased. For instance, the quantity of identified target components may be increased each time a different captured imagery (e.g., of a different portion of the path section at which a target component is expected to be) is received, and each captured imagery may be compared to target imagery. The quantity of identified target components may be increased each time a determination is made that the difference between the respective captured imagery and the target imagery is below a threshold value. Additionally or alternatively, the quantity of identified target components may be increased each time a different signal emitted by a different target component is received.

At block 208, data indicative of a second marker (e.g., a second gate) associated with a conclusion of the path section may be received. For example, the data indicative of the second marker may be received via a technique similar to receipt of the data indicative of the first marker associated with the beginning of the path section. In an embodiment, the second marker may directly indicate a point at which the path section ends or terminates. In an additional or alternative embodiment, the second marker may indicate a beginning of another path section and therefore indirectly indicate the conclusion of the path section. In either embodiment, a determination may be made that the vehicle completed travel of the path section in response to receiving the data indicative of the second marker.

At block 210, in response to receiving the data indicative of the second marker associated with the conclusion of the path section, a total quantity of identified target components may be determined. By way of example, monitoring of the quantity of identified target for the path section may be suspended, and the quantity of identified target components for the path section tallied during identification of the target components may be determined as the total quantity.

At block 212, a control signal may be output based on the total quantity of identified target components. In an embodiment, the control signal may be output to directly indicate the total quantity. For instance, the control signal may be output to inform a user of the total quantity, and the user may then determine whether the total quantity indicates the path section is to be addressed. In an additional or alternative embodiment, the control signal may be output based on a comparison between the total quantity and a target quantity of identified target components associated with the path section. For example, stored data may associate a corresponding, respective target quantity with each path section, and the target quantities may be indicative of a desirable condition for each respective path section. The target quantity for comparison with the total quantity may be selected based on the target quantity being associated with the path section associated with the first marker. The comparison between the total quantity and the target quantity may facilitate determination of whether a current condition of the path section, as indicated by the total quantity of target components, is desirable. Indeed, there may be a different target quantity for different path sections. Thus, each target quantity may indicate the desirable condition that is specific for the corresponding path section. The control signal may be output in response to a difference between the total quantity and the target quantity being equal to or greater than a threshold value. As an example, the difference between the total quantity and the target quantity being equal to or greater than the threshold value may indicate the current condition of the path section is undesirable. Thus, the control signal may be output to facilitate addressing the current condition, such as to prompt a user to address the path section. For instance, the control signal may indicate the determined difference between the total quantity and the target quantity, such as that a fastener may be potentially missing from the path section. In an additional or alternative embodiment, the control signal may be output based on the difference between the total quantity and the target quantity being below the threshold value. For example, the control signal may indicate the current condition of the path section is desirable. Indeed, the control signal may be output based on the total quantity of identified target components being equal to any suitable threshold range of quantities (e.g., a threshold range above the target quantity, a threshold range below the target quantity).

The method 200 may also be continually and/or repeatedly performed. For example, after receiving the data indicative of the second marker associated with a conclusion of the path section, data indicative of a third marker associated with a beginning of an additional path section may be received, and a total quantity of identified target components for the additional path section may be similarly determined (e.g., until data indicative of a fourth marker associated with completion of the additional path section is received). As such, respective total quantities of identified target components associated with each path section may be determined to determine whether each path section is in a desirable condition.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An inspection vehicle for an attraction system of an amusement park, the inspection vehicle comprising:
    one or more bogies configured to engage with a path of the attraction system;
    a sensor configured to capture imagery of the path; and
    a controller communicatively coupled to the sensor, wherein the controller is configured to:
        receive data indicative of a detected marker;
        determine a path section at which the inspection vehicle is located based on the detected marker;
        determine target imagery associated with the path section;
        receive captured imagery from the sensor; and
        output a control signal in response to determining a difference between the captured imagery received from the sensor and the target imagery is equal to or greater than a threshold value.

2. The inspection vehicle of claim 1, wherein the bogie comprises:
    a first set of wheels configured to engage with the path of the attraction system; and
    a second set of wheels configured to engage with a guide of the path of the attraction system.

3. The inspection vehicle of claim 1, comprising a plurality of sensors comprising the sensor, wherein the sensor or an additional sensor of the plurality of sensors is configured to identify the detected marker and transmit the data indicative of the detected marker to the controller.

4. The inspection vehicle of claim 1, wherein the controller is configured to:
    repeatedly receive additional captured imagery from the sensor;
    repeatedly monitor a quantity of times in which the difference between the additional captured imagery received from the sensor and the target imagery is less than the threshold value for the path section;
    receive data indicative of an additional detected marker;
    determine the inspection vehicle has completed travel of the path section in response to receiving the data indicative of the additional detected marker; and
    suspend monitoring of the quantity of times in which the difference between the additional captured imagery received from the sensor and the target imagery is less than the threshold value for the path section in response to determining the inspection vehicle has completed the travel of the path section.

5. The inspection vehicle of claim 4, wherein the controller is configured to:
    determine a total quantity of times in which the difference between the additional captured imagery received from the sensor and the target imagery is less than the threshold value for the path section;
    determine a target quantity for the path section; and
    output an additional control signal in response to determining a difference between the total quantity of times and the target quantity is greater than an additional threshold value.

6. The inspection vehicle of claim 1, wherein the bogie comprises an extension extending about a direction of travel of the bogie about the path.

7. The inspection vehicle of claim 6, wherein the controller is configured to instruct the extension to move the sensor relative to the path.

8. A vehicle for an attraction system of an amusement park, the vehicle comprising:
    a bogie configured to engage with a path system of the attraction system; and
    a controller configured to:
        receive data indicative of a first marker associated with a beginning of a path section of the path system;
        monitor a quantity of identified target components for the path section in response to receiving the data indicative of the first marker;
        receive data indicative of a second marker associated with a conclusion of the path section;
        determine a total quantity of identified target components for the path section in response to receiving the data indicative of the second marker and based on monitoring of the quantity of identified target components for the path section; and
        output a control signal based on the total quantity of identified target components.

9. The vehicle of claim 8, wherein the controller is configured to:
    compare the total quantity of identified target components to a target quantity associated with the path section; and
    output the control signal based on the comparison between the total quantity of identified target components and the target quantity.

10. The vehicle of claim 9, wherein the controller is configured to output the control signal in response to a difference between the total quantity of identified target components and the target quantity exceeding a threshold value.

11. The vehicle of claim 9, wherein the controller is configured to:

receive data indicative of a third marker associated with a beginning of an additional path section of the path system;

monitor an additional quantity of identified target components for the additional path section in response to receiving the data indicative of the third marker;

receive data indicative of a fourth marker associated with a conclusion of the additional path section;

determine an additional total quantity of identified target components for the additional path section in response to receiving the data indicative of the fourth marker and based on monitoring of the additional quantity of identified components for the additional path section;

compare the additional total quantity of identified target components to an additional target quantity associated with the additional path section, wherein the additional target quantity associated with the additional path section is different from the target quantity associated with the path section; and output an additional control signal based on the comparison between the additional total quantity of identified target components and the additional total quantity.

12. The vehicle of claim 8, comprising:
a set of wheels; and
an adjustable clamp configured to bias the set of wheels against a guide of the path system to engage the bogie with the path system.

13. The vehicle of claim 8, wherein the controller is configured to output the control signal in response to the total quantity of identified target components being equal to a threshold range of quantities.

14. The vehicle of claim 8, wherein the controller is configured to:
receive captured imagery of the path section;
compare the captured imagery to target imagery; and
increase the quantity of identified target components in response to determining a difference between the captured imagery and the target imagery is less than a threshold value.

15. A non-transitory computer-readable medium, comprising instructions that, when executed by a processor, are configured to cause the processor to:
receive data indicative of a first marker associated with a beginning of a path section of an amusement park attraction system;
identify target components for the path section in response to receiving the data indicative of the first marker;
receive data indicative of a second marker associated with a conclusion of the path section;
determine a total quantity of identified target components for the path section in response to receiving the data indicative of the second marker; and
output a control signal based on the total quantity of identified target components.

16. The non-transitory computer-readable medium of claim 15, wherein the instructions, when executed by the processor, are configured to cause the processor to output the control signal to indicate the path section in response to determining a difference between the total quantity of identified target components and a target quantity associated with the path section is above a threshold value.

17. The non-transitory computer-readable medium of claim 16, wherein the instructions, when executed by the processor, are configured to cause the processor to:
reference data associating each path section of a plurality of path sections of the amusement park attraction system with a corresponding, respective target quantity; and
select the corresponding, respective target quantity as the total quantity for comparison with the total quantity of identified target components based on the corresponding, respective target quantity being associated with the path section associated with the first marker.

18. The non-transitory computer-readable medium of claim 15, wherein the second marker is associated with a beginning of an additional path section.

19. The non-transitory computer-readable medium of claim 15, wherein the instructions, when executed by the processor, are configured to cause the processor to:
receive captured imagery;
compare the captured imagery to target imagery; and
identify a target component based on a difference between the captured imagery and the target imagery being below a threshold value.

20. The non-transitory computer-readable medium of claim 15, wherein the instructions, when executed by the processor, are configured to cause the processor to:
increase a quantity of identified target components for the path section in response to receiving a signal emitted by a respective target component; and
determine the total quantity of identified target components for the path section based on the quantity of identified target components increased in response to receiving the signal emitted by the respective target component.

* * * * *